Patented June 19, 1934

1,963,597

UNITED STATES PATENT OFFICE 1,963,597

NITRATION OF N-ACETYL-P-TOLUIDINE

John M. Tinker and Louis Spiegler, South Milwaukee, Wis., assignors to E. I. du Pont de Nemours & Company, Wilmington, Del., a corporation of Delaware No Drawing. Application January 25, 1932, Serial No. 588,814

7 Claims. (Cl. 260—124)

This invention relates to the manufacture of m-nitro-p-toluidine ($CH_3:NO_2:NH_2=1:3:4$). It is an object of this invention to provide a process for the manufacture of m-nitro-p-toluidine whereby the same is obtained in good yield and substantially free of the ortho-isomer. A further object of this invention is to provide a simple and efficient process for the manufacture of m-nitro-p-toluidine, by using the requisite initial materials in economical quantities. Other and further objects of this invention will appear as the description proceeds.

By m-nitro-p-toluidine and o-nitro-p-toluidine, we are referring respectively to the following two compounds:

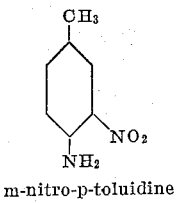
m-nitro-p-toluidine

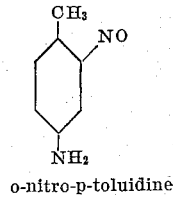
o-nitro-p-toluidine the o, m and p substituents being oriented with respect to the $CH_3$ group.

m-nitro-p-toluidine has been prepared in the art by reacting upon an acidyl derivative of p-toluidine with nitric acid. This process, however, requires a large excess of nitric acid, which renders the operation prohibitive from a practical viewpoint. To remedy this objection it has been proposed to use as nitrating agent, a mixture of concentrated sulfuric and nitric acid. (Noyes, Am. Chem. Jour., Vol. 10, page 475; Beilstein, 4th Ed., Vol. XII, page 1000). This method, however, has the objection that considerable quantities of the ortho isomer are formed in the reaction. The process, therefore, entails costly and complicated separation procedures, in order to isolate the pure m-isomer.

We have now found that if instead of concentrated sulfuric acid, dilute sulfuric acid is used, the reaction proceeds smoothly toward the production of m-nitro-p-toluidine substantially free of the ortho isomer. Based on this discovery, our novel process consists of treating an acidyl-p-toluidine with nitric acid in a medium of sulfuric acid of less strength than 60° Bé. In its more preferred form, our process consists of reacting upon acetyl-p-toluidine with about 1 to 2 molal ratios of nitric acid in admixture with aqueous sulfuric acid of 40 to 78% strength, and hydrolyzing the resulting 4-acetylamino-3-nitro-toluene body. The use of sulfuric acid of a strength below 40% decreases the speed of nitration unless excessive quantities of either nitric or sulfuric acid are used. The use of concentrated sulfuric acid above 78% (60° Bé.), results in the by-production of the ortho-isomer. For best results, the concentration of sulfuric acid should be gradually built up, as the reaction proceeds, from a value near the lower concentration limit above stated to one near the higher limit. The object of this is to bring back into solution any of the m-nitro-p-acetylaminotoluene which may have precipitated out during the reaction, while at the same time avoiding excesses of sulfuric acid beyond the minimum concentration required for complete solution of the reaction mass, especially during the initial stages of the rection.

The quantity of nitric acid used may vary from about one to two moles for each mole of acetyl p-toluidine. The yield generally increases with the larger quantities of nitric acid.

For best results, the temperature of the reaction mass should be kept between 18 and 25° C., although some variation outside these limits is permissible. Below 15° C., however, the reaction proceeds at a very slow rate, and contains further the danger of starting suddenly at an uncontrollable rate. Again, above 30° C., the nitration proceeds too fast for proper control, and results in a decreased yield of the desired product.

Without limiting our invention to any particular procedure, the following example is given to illustrate our preferred mode of operation. Parts given are by weight.

Example 100 parts of finely milled N-acetyl-p-toluidine, and 431 parts of 60° Bé. sulfuric acid are added gradually to a mixture of 91.4 parts of 56.4% nitric acid, and 114 parts of 60° Bé. sulfuric acid while stirring the mass rapidly. The temperature is maintained at about 21° C. The said addition of the acetyl body and sulfuric acid is preferably effected as follows; during the first ten minutes 35.5 parts of acetyl-p-toluidine are added; then 43.1 parts of 60° Bé. sulfuric acid and 20.3 parts of the acetyl body are fed in simultaneously over a period of ten minutes. At this point the nitration mass crystallizes out, and the temperature rises to 24-25° C. The mix is cooled to 21° C.; and over a period of 20 minutes the balance of the acetyl body is introduced together with 222.5 parts of the 60° acid. The remainder of the sulfuric acid is then added in a period of 10-20 minutes.

After stirring for 1½ to 2 hours, the nitration mass is diluted with ice and water to bring the temperature down to about 5–12° C., whereupon the water-insoluble m-nitro-acetyl-p-toluidine crystallizes out. The latter is now filtered off and washed.

The wet cake from the nitration mass can be hydrolyzed without further purification. One obtains thus m-nitro-p-toluidine of excellent quality and in a yield of 77–82% of theory, based on the initial mass of acetyl-p-toluidine.

If desired, the wet cake may be reduced directly to the corresponding m-amino-p-acetyl-amino-toluene, without hydrolysis.

Many variations and modifications are possible in our preferred procedure, without departing from the spirit of this invention, as will be readily understood to those skilled in the art.

In the claims below it should be understood that by the term "m-nitro-p-toluidine" we are referring to 3-nitro-4-amino-1-toluene; by the term "m-nitro-p-acetylamino-toluene" we are referring to 3-nitro-4-acetylamino-1-toluene.

We claim:

1. A process for preparing m-nitro-p-toluidine which comprises the step of reacting upon N-acetyl-p-toluidine with nitric acid in a medium of sulfuric acid of less strength than 60° Bé.

2. A process for preparing m-nitro-p-toluidine which comprises the step of reacting upon N-acetyl-p-toluidine with nitric acid in a medium of sulfuric acid of 40 to 78% strength.

3. A process for preparing m-nitro-p-acetylamino-toluene which comprises reacting upon N-acetyl-p-toluidine with 1 to 2 molal ratios of nitric acid in a medium of aqueous sulfuric acid of 40 to 78% strength and at a temperature between 15 and 30° C.

4. A process for preparing m-nitro-p-acetylamino-toluene which comprises reacting upon N-acetyl-p-toluidine with 1 to 2 molal ratios of nitric acid in a medium of aqueous sulfuric acid of 40 to 78% strength, and a temperature between 18 and 25° C., diluting the reaction mass, and isolating m-nitro-p-acetylamino-toluene.

5. A process for preparing m-nitro-p-acetylamino-toluene which comprises reacting upon N-acetyl-p-toluidine with 1 to 2 molal ratios of nitric acid, at a temperature between 18 and 25° C., and in a medium of aqueous sulfuric acid increasing in concentration, as the reaction proceeds, from about 40 to about 78% strength, diluting the reaction mass, and isolating m-nitro-p-acetylamino-toluene.

6. In the process of preparing m-nitro-p-toluidine by reacting upon p-acetylamino-toluene with aqueous nitric acid, the step of effecting the reaction in an aqueous sulfuric acid medium of a strength not substantially higher than the minimum required for keeping the entire reaction mass in solution under the particular working conditions.

7. In the process of preparing m-nitro-p-toluidine by nitrating N-acetyl-p-toluidine, the improvement which comprises effecting the nitration in a sulfuric acid medium of 40 to 78% strength and at a temperature between 15 and 30° C.

JOHN M. TINKER.
LOUIS SPIEGLER.